(12) United States Patent
Pedrini

(10) Patent No.: US 9,393,912 B2
(45) Date of Patent: Jul. 19, 2016

(54) BICYCLE-CARRIER DEVICE FOR MOTOR VEHICLES

(71) Applicant: Fabio Pedrini, Bologna (IT)

(72) Inventor: Fabio Pedrini, Bologna (IT)

( * ) Notice: Subject to any disclaimer, the term of this patent is extended or adjusted under 35 U.S.C. 154(b) by 0 days.

(21) Appl. No.: 14/175,453

(22) Filed: Feb. 7, 2014

(65) Prior Publication Data

US 2014/0158729 A1  Jun. 12, 2014

Related U.S. Application Data

(63) Continuation of application No. 13/847,692, filed on Mar. 20, 2013, now abandoned, which is a continuation of application No. 13/586,194, filed on Aug. 15, 2012, now abandoned.

(30) Foreign Application Priority Data

Sep. 8, 2011   (IT) ............................... TO2011A0800

(51) Int. Cl.
*B60R 9/10* (2006.01)
*B60R 9/06* (2006.01)

(52) U.S. Cl.
CPC ... *B60R 9/10* (2013.01); *B60R 9/06* (2013.01); *Y10S 224/924* (2013.01)

(58) Field of Classification Search
CPC ..................... Y10S 224/924; B60D 2001/003; B60R 9/06; B60R 9/10; B60R 2011/004; F16C 11/10; A47C 20/043
USPC .......................... 224/924, 519, 521, 501–509; 211/17–22; 403/79, 91–103, 161–163; 410/3; D12/407–408; 248/218.4, 248/219.1, 220.21, 229.2
See application file for complete search history.

(56) References Cited

U.S. PATENT DOCUMENTS

| | | | |
|---|---|---|---|
| 488,395 A | 12/1892 | Justice |
| 529,827 A | 11/1894 | Fonda |
| 556,789 A | 3/1896 | Walker |
| 576,351 A | 2/1897 | Penfield |
| 586,681 A | 7/1897 | Douglas |
| 607,024 A | 7/1898 | Durfee et al. |
| 615,264 A | 12/1898 | Du Pont |
| 623,807 A | 4/1899 | Myers |
| 1,179,823 A | 4/1916 | Greene |

(Continued)

FOREIGN PATENT DOCUMENTS

| DE | 4330019 | 3/1995 |
| DE | 19934384 | 1/2001 |

*Primary Examiner* — Justin Larson
*Assistant Examiner* — Scott McNurlen
(74) *Attorney, Agent, or Firm* — Boyle Fredrickson, S.C.

(57) ABSTRACT

A bicycle-carrier device includes a brace for connection to the frame of a vehicle, and bearing supporting elements to support one or more bicycles oriented transversely relative to the vehicle. The brace consists of a transverse bar, and the bicycles are supported by at least first and second supporting elements affixed to the bar, in positions that can be adjusted along the bar, so as to receive and support from below the two wheels of a bicycle. Mounted on the bar in an articulated manner is an arm that can be shifted between a raised operating position and a lowered non-operating position. Secured to the bar in an adjustable manner is at least one third supporting element that receives and supports from below an element of a bicycle frame. Each of the supporting elements is provided with means for locking in place the part that is received.

17 Claims, 12 Drawing Sheets

(56) References Cited

U.S. PATENT DOCUMENTS

| | | |
|---|---|---|
| 1,912,958 A | 6/1933 | Widener |
| 1,977,734 A | 10/1934 | Monckmeier |
| 2,179,163 A | 11/1939 | Roth |
| 3,251,520 A | 5/1966 | Van Dyke et al. |
| 3,529,737 A | 9/1970 | Daugherty |
| 3,744,689 A | 7/1973 | Kjensmo |
| 3,891,132 A | 6/1975 | Chandler |
| 3,972,456 A | 8/1976 | Saffold |
| 3,993,229 A | 11/1976 | Summers |
| 4,088,253 A | 5/1978 | Saffold |
| 4,125,214 A | 11/1978 | Penn |
| 4,171,077 A | 10/1979 | Richard, Jr. |
| 4,213,729 A | 7/1980 | Cowles et al. |
| 4,360,135 A | 11/1982 | Goble |
| 4,400,129 A | 8/1983 | Eisenberg et al. |
| 4,403,716 A | 9/1983 | Carlson et al. |
| 4,437,597 A | 3/1984 | Doyle |
| 4,702,401 A * | 10/1987 | Graber et al. ............... 224/536 |
| 4,875,608 A | 10/1989 | Graber |
| 5,169,044 A | 12/1992 | Englander |
| 5,570,825 A | 11/1996 | Cona |
| 5,709,521 A | 1/1998 | Glass et al. |
| 5,794,828 A * | 8/1998 | Colan et al. ............... 224/530 |
| 6,019,266 A | 2/2000 | Johnson |
| 6,123,498 A | 9/2000 | Surkin |
| 6,149,039 A | 11/2000 | Englander |
| 6,491,195 B1 | 12/2002 | McLemore et al. |
| 6,523,731 B1 | 2/2003 | Pedrini |
| 6,745,926 B2 * | 6/2004 | Chimenti ............... B60R 9/06 224/495 |
| 6,761,297 B1 | 7/2004 | Pedrini |
| 6,857,545 B2 | 2/2005 | McLemore et al. |
| 6,929,163 B1 * | 8/2005 | Pedrini et al. ............... 224/506 |
| 7,044,347 B1 | 5/2006 | Pedrini |
| 7,222,763 B2 | 5/2007 | Pedrini |
| 7,240,816 B2 | 7/2007 | Tsai |
| 7,648,151 B2 | 1/2010 | Pedrini |
| 2005/0284905 A1 | 12/2005 | Naslund et al. |
| 2007/0108245 A1 | 5/2007 | Ferman et al. |
| 2008/0099522 A1 | 5/2008 | Clausen et al. |
| 2008/0230579 A1 | 9/2008 | Wang |
| 2009/0120984 A1 | 5/2009 | Sautter et al. |
| 2009/0236382 A1 | 9/2009 | Sautter et al. |
| 2010/0320247 A1 | 12/2010 | Wang et al. |
| 2013/0022440 A1 | 1/2013 | Sautter et al. |
| 2013/0062383 A1 | 3/2013 | Jeli |
| 2013/0062385 A1 | 3/2013 | Pedrini |

* cited by examiner

BICYCLE-CARRIER DEVICE FOR MOTOR VEHICLES

CROSS REFERENCE TO RELATED APPLICATIONS

This application is a continuation of U.S. application Ser. No. 13/847,692, filed Mar. 20 2013, which is a continuation of U.S. application Ser. No. 13/586,194, filed Aug. 15, 2012, which claims priority from Italian Application No. TO2011A000800, filed Sep. 8, 2011.

BACKGROUND AND SUMMARY OF THE INVENTION

The present invention relates to bicycle-carrier devices for motor vehicles, of the type consisting of a brace equipped with connection means for connecting the said brace to the frame of the motor vehicle behind the motor vehicle, and supporting means carried by the said brace in order to support one or more bicycles behind the motor vehicle, with the bicycles oriented transversely in relation to the longitudinal direction of the motor vehicle.

Specifically, the invention relates to devices of the type described above, in which the bicycles are not suspended from the bicycle-carrier but instead are supported from below, by means of supporting elements upon which the wheels of the bicycles rest.

A first purpose of the present invention is to implement a bicycle-carrier device of this type whose structure is extremely simple and economical to manufacture.

A further purpose is to implement a bicycle-carrier device of this type that has extremely limited dimensions but that at the same time is extremely versatile, such that it can be designed to carry bicycles of any dimensions and configurations, including bicycles with non-standard configurations, such as, for example, bicycles on which the cyclist adopts a semi-supine position, which bicycles are characterized by an extended wheelbase.

Yet another purpose is to implement a bicycle-carrier device of the type described above that, in addition to displaying the above-mentioned characteristics of simplicity and versatility, can also be used easily and rapidly.

The above-mentioned goals are achieved, according to the invention, through the provision of a bicycle-carrier device that includes:

A brace equipped with connection means for connecting the said brace to the frame of the motor vehicle behind the motor vehicle;

Supporting means carried by the said brace in order to support one or more bicycles behind the motor vehicle, with the bicycles oriented transversely in relation to the longitudinal direction of the motor vehicle, characterized by the fact that the said brace includes a bar that, when the bicycle-carrier device is mounted on the motor vehicle, extends transversely in relation to the longitudinal direction of the motor vehicle; and by the fact that the said supporting means include:

At least one first supporting element and one second supporting element secured to the bar in a position that can be adjusted along the bar, in order to receive and support from below the two wheels of a bicycle, respectively, and An articulated arm that is mounted on the bar and that can be shifted between a raised operating position that is substantially orthogonal to the bar and a lowered non-operating position, and At least one third supporting element secured to the said arm into position that can be adjusted along the arm, in order to receive and support from below an element of the frame of a bicycle, with each of the said first, second, and third supporting elements being provided with means for locking in place the part that is received.

In the preferred embodiment, each of the said first and second supporting elements includes a body made of a cradle-shaped plastic material in order to receive a respective wheel of a bicycle, with the said cradle-shaped body consisting of one single piece with a clamp portion locked removably onto the said bar.

In this preferred embodiment, the bar is a hollow metal bar with a quadrangular cross-section, which, when in the mounted position on the motor vehicle, displays an upper surface, lower surface, a front surface, and a rear surface. The above-mentioned arm consists of an inverted U-shaped element, with two parallel branches whose ends are positions respectively on the front surface and on the rear surface of the bar, and are joined thereto in an articulated manner about a common axis, parallel to the longitudinal direction of the motor vehicle when the device is in its mounted position. One of the two branches of the U-shaped element constituting the said arm has an extremity that is extended beyond the said axis of articulation of the arm and carries a latch that is suitable for engaging a seat formed in the bar or in an element rigidly connected to the bar, so as to lock the arm in its raised operating position. The latch consists of a pin slidably mounted inboard of the said extended extremity of the arm and drawn by a spring toward a position of engagement with the said seat. The said pin is connected to a handle that can be grasped in order to draw the pin, against the action of the spring, toward a position in which it is disengaged from its seat. The said pin is also designed to engage the upper surface of the bar or of an element rigidly connected to the bar, with the bar in the lowered non-operating position, in order to lock the arm in the said position.

Still with regard to the above-mentioned preferred embodiment, the two parallel branches of the U-shaped element constituting the arm are associated respectively with the above-mentioned third supporting element and a fourth supporting element, each of which includes a cradle-shaped body in order to receive the respective elements of the frame of two bicycles, with the said body being connected orientably about a longitudinal axis (with reference to the mounted position on the motor vehicle) to a clamp portion that is locked removably onto the respective branch of the said U-shaped element constituting the arm.

The above-mentioned third supporting elements are preferably positioned so as to support the bicycle frame, not in correspondence with its highest element (that is, the horizontal tube, for a standard frame), but rather in correspondence with a lower element (typically the diagonal tube, or even the seat tube). As a result, the above-mentioned arm carrying the elements that support the bicycle can be relatively small in size, with a resulting reduction in the overall dimensions of the device.

The means connecting the bar to the frame of the motor vehicle include an auxiliary connecting arm extending orthogonally from a central part of the bar and having a facing extremity positioned for connection to a hitch on the motor vehicle, which typically is a hitch for pulling a trailer. In one embodiment the auxiliary arm is connected rigidly to the bar, while in a variant the auxiliary arm is connected to the bar in an articulated manner about an axis parallel to the bar, and is equipped with stop means so as to allow limited oscillation of the entire bicycle-carrier device in relation to the auxiliary arm, between an upright operating position and a tilted position, angled away from the motor vehicle, so as to facilitate access to the luggage compartment of the motor vehicle when the device is in its mounted position on the motor vehicle, even with the bicycles mounted on the device.

According to a further optional characteristic, the bar supports an auxiliary structure that includes a number-plate holder and taillights.

Thanks to the above-mentioned characteristics, the invention provides significant advantages in terms of construction simplicity, versatile applicability, reduced size, and ease and rapidity of use.

BRIEF DESCRIPTION OF THE DRAWINGS

These and other advantages will become clear from the following description, which makes reference to the annexed drawings, which are provided non-limitatively and purely as examples, on which.

DETAILED DESCRIPTION OF THE INVENTION

On the drawings, the number [1] designates, in its entirety, a bicycle-carrier device for motor vehicles of the type intended to be connected to the frame of a motor vehicle behind the motor vehicle, with the aid of a hitch provided on the motor vehicle in order to pull a trailer. The bicycle-carrier device according to the invention is intended to carry one or more bicycles (two bicycles, in the embodiment illustrated here) oriented transversely in relation to the longitudinal direction of the motor vehicle, behind the motor vehicle (see FIGS. 7 through 9). For this purpose, the device includes a brace structure, indicated in its entirety by number [2], that is equipped with supporting means in order to support one or more bicycles.

Figure 1:
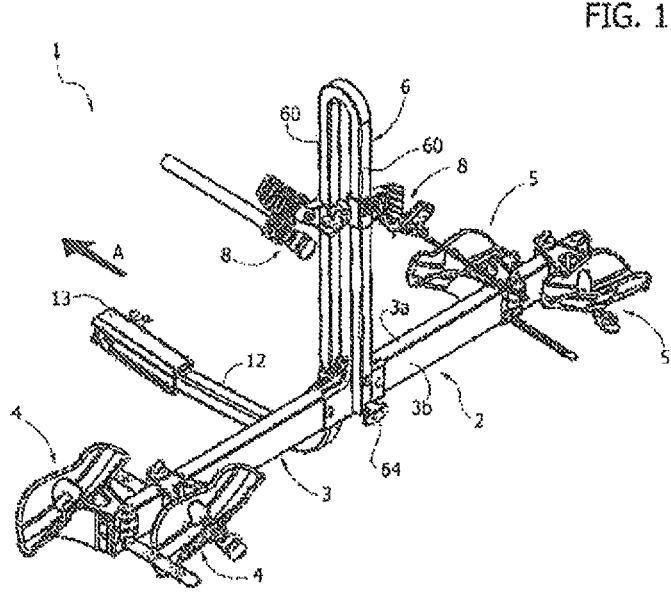
FIG. 1 is a perspective view of a first embodiment of the bicycle-carrier device according to the invention, with the articulated arm in its raised operating position.

In the preferred embodiment of the invention, the brace structure [2] consists exclusively of a metal bar [3]. In the example shown here, the bar [3] is a straight hollow metal bar with a quadrangular cross-section, which, when in the mounted position on the motor vehicle, includes an upper surface [3a], a lower surface (not visible on the drawings), a front surface [3b], facing the side opposite the direction of forward travel of the motor vehicle, which is indicated in FIG. 1 by the arrow [A], and a rear surface, facing in the direction [A], which also is not visible on the drawings.

Figure 3:
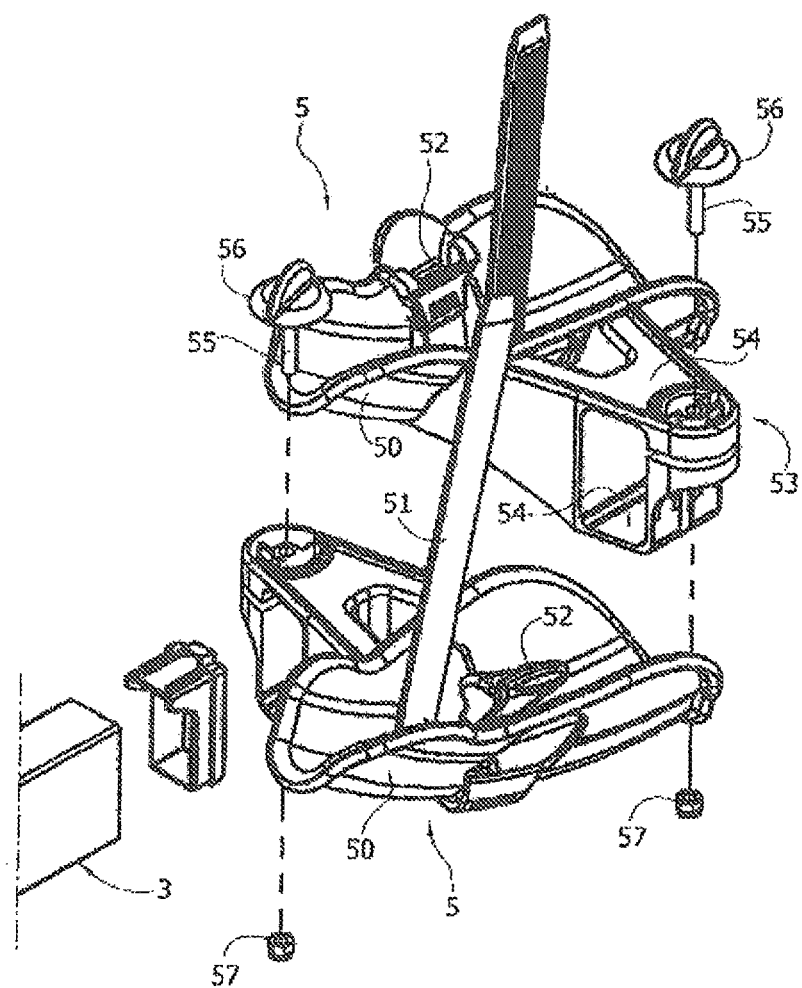
FIG. 3 is another exploded perspective view of another detail of FIG. 1.

The means for supporting the bicycle include at least one first and one second supporting elements [4] [5] intended to receive and to support from below the wheels of a respective bicycle. In the examples of embodiments shown, the bar is equipped with two pairs of identical supporting elements [4] [5] in order to support two bicycles. The form of each supporting element will be better understood with reference to FIG. 3, which shows an enlarged view of the structure of the two supporting elements [5], with the structure of the supporting elements [4] being entirely identical. As shown, each supporting element includes a cradle-shaped body [50] made of a plastic material intended to receive a respective wheel of a bicycle in the manners shown, for example, in FIGS. 7 through 9. Each cradle-shaped body [50] is also equipped with a fastening strap [51], one of whose ends is connected to the cradle-shaped body, with the other, free end being capable of being secured by means of a buckle [52] that is also associated with the cradle-shaped body [50]. The cradle-shaped body [50] is made of a single piece of plastic material, with a clamp portion [53] that has two jaws [54] that are suitable for locking between them the body of the bar [3], through the tightening of a screw [55] equipped with an operating knob [56]. The screw [55] passes through aligned holes in the jaws [54] and engages a nut [57] (see FIG. 3). Thanks to this arrangement, each supporting element can be locked removably onto the bar [3], in any desired position along the bar. Naturally, the configuration of the supporting elements [4] [5] and of the associated fastening means [51] [52] may vary greatly from the example shown here. Each extremity of the hollow bar [3] is closed by a plastic cap [58] (see FIG. 3) that includes a stop block [59] that serves as a safety element, to prevent the supporting elements [4] [5] from sliding off of the bar [3].

Figure 7:
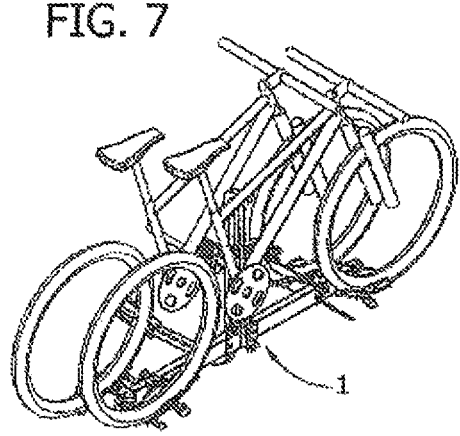
FIGS. 7, 8, and 9 are perspective views that show various methods of use of the device shown in FIG. 1.
Figure 8:
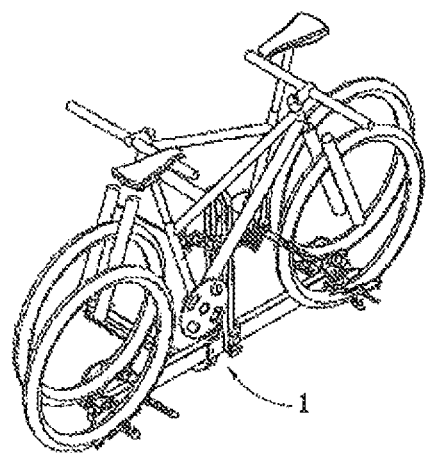
Figure 9:
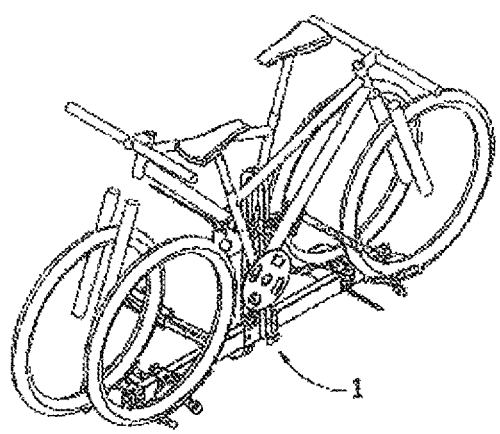

With reference again to FIG. 1, the two pairs of supporting elements [4] [5], intended to receive and support the wheels of two bicycles, are mounted in positions that are axially distributed along the bar [3], with the cradle-shaped bodies [50] located on the two sides of the bar [3], in order to receive the two bicycles in one of the mariners shown in FIGS. 7 through 9.

Figure 2:
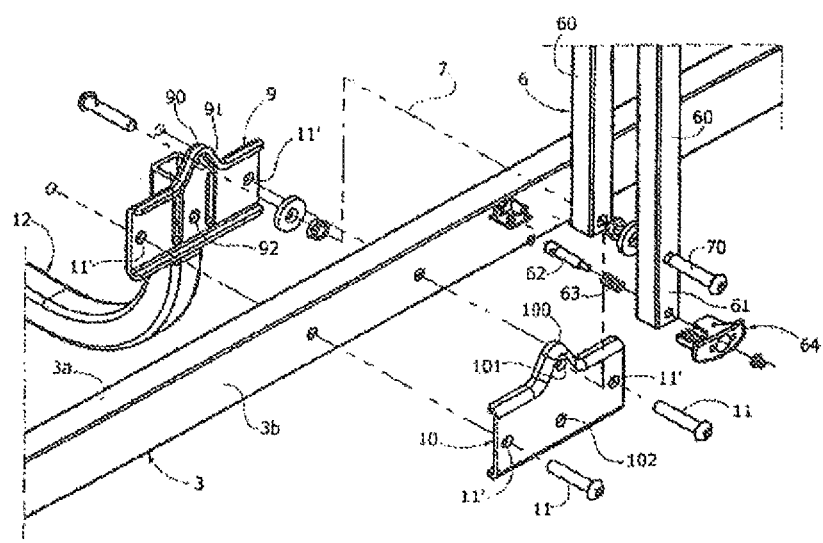
FIG. 2 is an exploded perspective view of a detail of FIG. 1.
Figure 5:
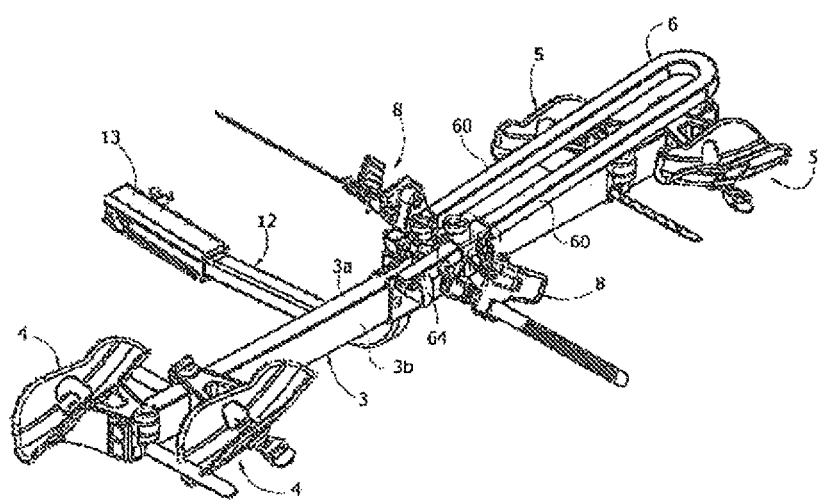
FIG. 5 is a perspective view of the device in FIG. 1 with the arm in the lowered non-operating position.
Figure 6:
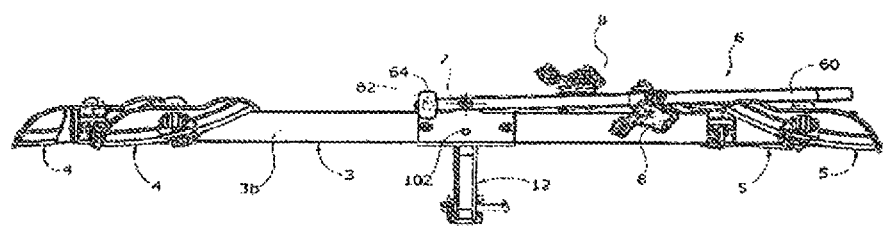
FIG. 6 is a front view corresponding to the state shown in FIG. 5.

The means for supporting the bicycles also include an arm [6] that is mounted in an articulated manner on the bar [3] about an axis [7] (see FIG. 2) parallel to the longitudinal direction of the motor vehicle (with reference to the mounted position of the device). In the example of the embodiment shown here, the arm [6] consists of a U-shaped metal bar that is hollow and that has a quadrangular cross-section, with two rectilinear branches [60] that are parallel to each other and whose extremities are joined in an articulated manner to the bar [3] in correspondence with the front surface and the rear surface of the bar, as shown in FIG. 2. Thus, the bar [6] can be shifted between an upright operating position, orthogonal to the bar [3], as shown in FIG. 1, and a non-operating position, lowered onto the bar [3], as shown in FIGS. 5 and 6. The function of the arm [6] is to came at least one third supporting element [8] for an element of the bicycle frame.

In the embodiments shown, two supporting elements [8] are provided that are intended to support the frame of the two bicycles resting on the two pairs of supporting elements [4] [5]. More specifically, each supporting element [8] it intended to support one element of the bicycle frame that is not the highest element of the frame (which, for a standard frame, is the horizontal tube), but that is instead a lower element, typically the diagonal tube of the bicycle frame (or, alternatively, the seat tube). Because the bicycle frame is supported in correspondence with one of its lower parts, the arm [6] may be relatively short, with the resulting advantage of reducing the overall dimensions of the device. Moreover, this arrangement is entirely sufficient to counter a tilting or moment load of the bicycle, due to the fact that the arm [6] has the U-shaped configuration as shown, with two branches [60] joined in an articulated manner to the bar [3] at longitudinally separated points, so as to be able effectively to withstand forces that tend to cause the arm [6] to rotate about an axis parallel to the bar [3].

Figure 4:
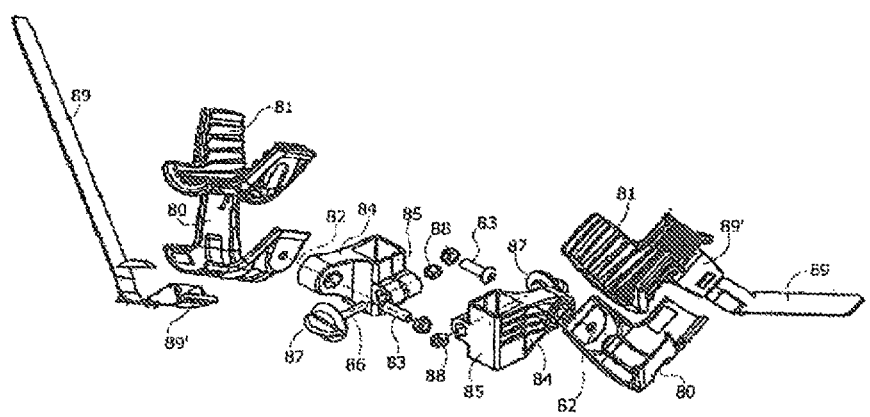
FIG. 4 is another exploded perspective view of another detail of FIG. 1.

The structure and shape of each of the supporting elements [8] in accordance with the embodiment shown here, can be seen more clearly in FIG. 4. In this case, each supporting element [8] includes a cradle-shaped body [80] equipped with a covering element [81] made of a plastic material and having a knurled surface that is suitable for engaging, by friction, the element of the bicycle frame. The cradle-shaped body [80] is mounted orientably about an axis [82], by means of a bolt [83], on a bracket [84] of a clamping unit [85], which can be locked onto the respective branch [60] of the arm [6] by means of a screw [86] provided with an operating knob [87] that is suitable for engaging a nut [88]. This way, each supporting element [8] can be secured removably to the respective branch [60] of the arm [6] at any desired position. Each of the covering elements [81] is provided with a retaining element that includes a strap or band [89] (see FIG. 4) of a known type. With regard to the supporting elements [8], the configuration of these elements may vary greatly from the example shown here.

FIG. 2 shows how, in the illustrated embodiment, the articulated installation of the arm [6] on the bar [3] is achieved. In this case, the said articulated installation is achieved with the aid of a pair of metal plates [9] [10] that grip between them the bar [3] and that are secured thereto, on its rear surface and on its front surface, respectively, by means of bolts [11] that engage holes [11'] formed in the plates [9] [10] and in the front and rear walls of the bar [3]. The two bars [9] [10] include upper central "ears" [90] [100] with aligned holes [91] [101] that are engaged by a pivot pin or trunnion [70]. The pivot pin or trunnion [70] engages aligned holes in the branches [60] of the arm [6], thereby defining the axis of articulation [7], which is located immediately above and adjacent to the upper surface [3a] of the bar [3], as shown clearly in FIG. 2 and in FIGS. 6A and 6B.

Figure 6A:
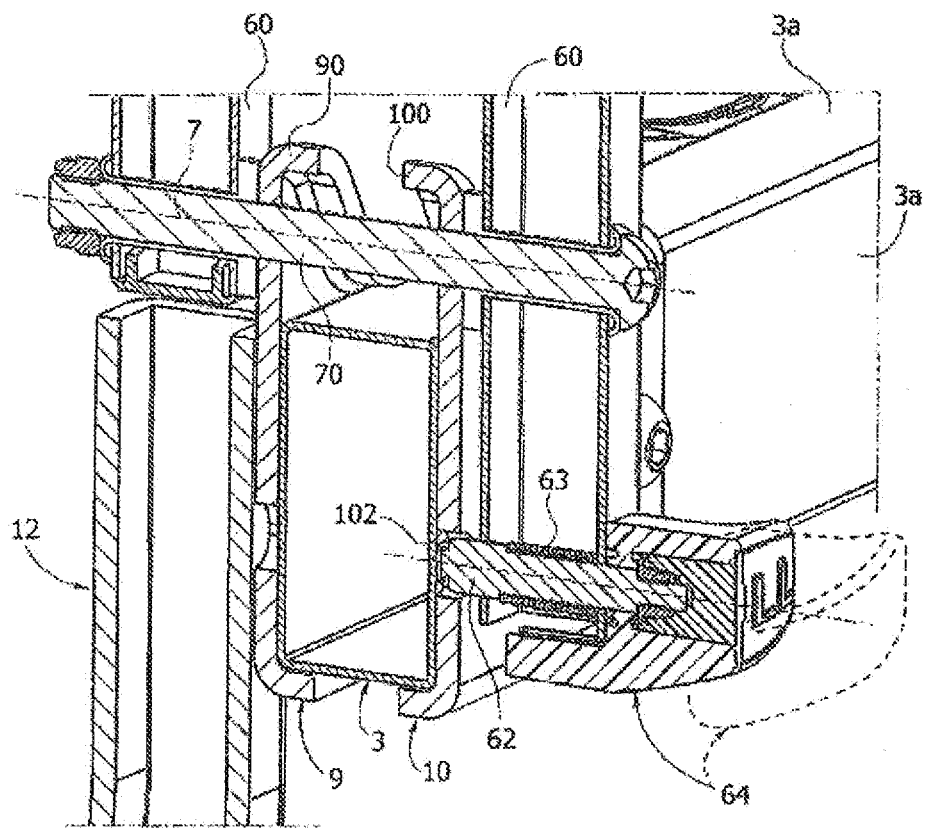
FIGS. 6A and 6B are enlarged perspective views, in partial cross-section, of a detail of FIGS. 1 and 2.
Figure 6B:
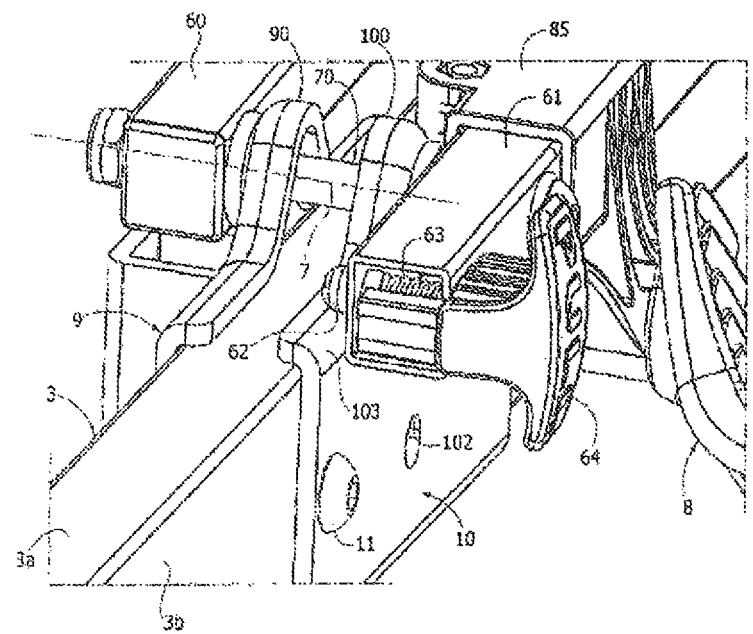

As also visible in FIGS. 2, 6A, and 6B, one of the two branches [60] of the arm [6] has an extremity [61] that extends beyond the axis of articulation [7], and that is designed by reference number [61]. This extremity [61] includes a slidable latch, in the form of a pin [62] that is drawn by a spring [63] toward a position of engagement with a seat that forms an integral part of the bar [3] or an element connected thereto. In the example shown, this seat is defined by a hole [102] formed in the plate [10]. For the sake of uniformity during manufacture, the plate [9] is identical to the plate [10], and therefore also includes a hole, indicated in FIG. 2 by reference number [92], that however is not used. The latch [62] engages the hole [102] (which preferably is elongated vertically, in order to take into account manufacturing tolerances), in order to lock the arm [6] in its operating position as shown in FIG. 1. The latch [62] can be disengaged from the hole [102] by means of a handle [64] that is secured to one extremity of the pin [62] and that protrudes frontally from the extremity [61] of the arm [6] (see also FIGS. 6A and 6B). In this manner, the handle [64] can be pulled in order to disengage the latch [62] and allow the arm [6] to be lowered into the non-operating position shown in FIGS. 5 and 6. Thanks to the fact that the axis of articulation [7] of the arm [6] is positioned immediately above the bar [3], when the said arm [6] is in its non-operating position, then the latch [62] assumes a position above the upper surface [3a] of the bar [3] and engages an upturned upper edge [103] of the plate [10] (see FIG. 6B), thereby preventing the unwanted raising of the arm [6]. The arm [6] may be returned to its operating position only when the handle [64] is actuated again in order to disengage the latch [62] from the edge [103] of the plate [10] and thereby allow the arm [6] to be raised to its operating position, in which the latch [62] again engages the hole [102] in the plate [10].

In the embodiment shown in FIGS. 1 through 9, the means for connecting the bar [3] to the frame of the motor vehicle include simply an L-shaped auxiliary bar [12] with a straight branch oriented in the direction [A] (see FIG. 1) and a vertical branch welded to the plate [9] (see FIGS. 1 and 2). The opposite end of the arm [12] is connected to a hitch [13] with which the motor vehicle is equipped, in order to connect a trailer. (FIG. 1 shows a standard hitch used in the United States.)

FIGS. 7 through 9 show various ways of using the bicycle-carrier device described hereinabove. FIG. 7 refers to the case in which the two bicycles are both oriented in the same direction, while FIGS. 8 and 9 show bicycles oriented in opposite directions, with the bicycle that is farther from the motor vehicle shifted leftward, or rather, rightward in relation to the other bicycle.

Figure 10:
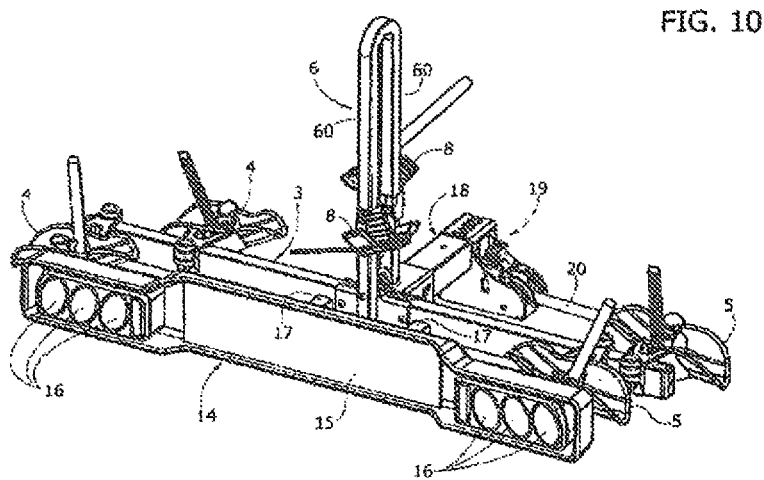
FIGS. 10 and 11 are perspective views of a second embodiment of the bicycle-carrier device according to the invention.
Figure 11:
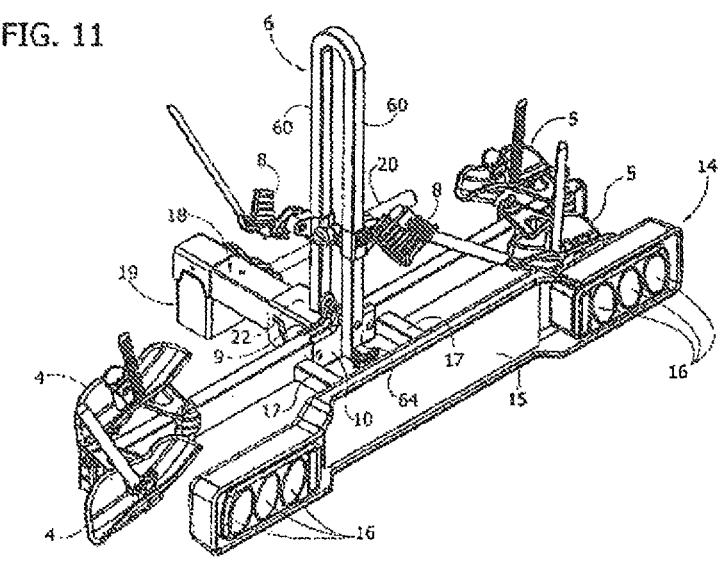
Figure 12:
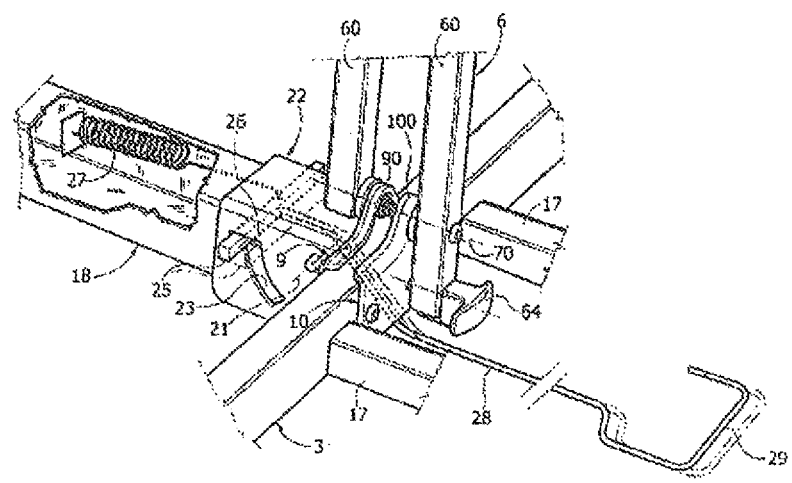
FIG. 12 is an enlarged perspective view of a detail in FIG. 11.

FIGS. 10 through 12 refer to a second embodiment, in which the parts corresponding to those in the embodiment shown in FIGS. 1 through 6 and in FIGS. 6A and 6B are designated by the same reference numbers.

The embodiment illustrated in FIGS. 10 through 12 differs from the one described hereinabove solely in terms of the structure and shape of the auxiliary arm that connects the bicycle-carrier device to the frame of the motor vehicle, and due to the fact that the bar is connected frontally to an auxiliary structure [14], in the form of a crossbar, that includes a central number-plate holder [15] and two lateral supports with taillights [16]. The said auxiliary structure [14] is rigidly connected to the bar [3] by means of fastener bars [17] that are welded at their ends to the bar [3] and to the structure [14]. Moreover, as indicated, the auxiliary bar that provides the connection to the frame of the motor vehicle has a different shape, consisting of a hollow metal bar with a quadrangular cross-section, designated in its entirety by reference number [18], which is equipped at its end opposite the bar [3] with a fastener device [19] of any known type intended to connected to the spherical body of a motor-vehicle tow coupling, in accordance with the standard shape provided in Europe. The device [19] has an actuating lever [20] that can be shifted from a non-operating position to an operating position in order to bring the fastener device [19] into a position in which it grips the spherical body of the tow coupling, in accordance with a known technique. The structure and the shape of the device [19] are not shown here, because they can be implemented in any known manner, and because these aspects, taken in their own right, do not lie within the scope of the present invention.

Still with reference to the embodiments shown in FIGS. 10 through 12, the auxiliary arm consisting of the bar [18] has an extremity that is located opposite the device [19] and that is connected to the bar [3], in an articulated manner about an axis [21] that is parallel to the bar [3], by a pivot pin or trunnion (not shown). In the embodiment shown, the bar [3] is rigidly connected, in correspondence with its rear surface, to a U-shaped bracket [22] within which is received and connected, in an articulated manner, the front end of the auxiliary bar [18]. The said auxiliary bar [18] is also provided with a transverse pin [25], with a square cross-section, whose extremities are guided between two longitudinal slots [26] formed in the lateral walls of the bar [18] (only one slot [26]

is partially visible in FIG. 12), or else between curved slots [24] formed in the two lateral wings of the bracket [22].

In the normal operating state illustrated in FIG. 12, the pin [25] is held by a spring [27] between horizontal end portions of the curved slots [24], such that any relative oscillation about the axis [21] between the bracket [22] and the bar [18] is prevented, and the bicycle-carrier device is locked in its working position. The pin [25] may be carried as far as the curved section of the slots [24], in opposition to the action of the spring [27], by a metal wire [28] that is provided with a grip [29] that protrudes frontally from the structure [14] so as to be readily accessible to the user. In this state, the entire structure of the bicycle-carrier device, along with the bicycles that may be carried on it, may be tilted, angled away from the motor vehicle, about the axis [21], in order to facilitate access to the luggage compartment of the motor vehicle. The lower ends of the slots [24] serve as stops that limit the tilted position of the structure of the bicycle-carrier device.

As is clear from the foregoing description, the bicycle-carrier device according to the invention, in both of the embodiments described hereinabove, offers a series of significant advantages.

First of all, the device is relatively small in size, despite being suitable for receiving bicycles of any size and configuration. The cradle-shaped bodies of the supporting elements may be positioned adjacent to the extremities of the bar, so as to be able to receive bicycles with a substantially long wheelbase, bearing in mind that the cradle-shaped bodies can be positioned at a distance from each other that is shorter than the wheelbase. For bicycles with a non-standard configuration, e.g., with a very long wheelbase, the bicycle-carrier device can easily be adapted through the appropriate dimensioning of the bar [3]. The supporting element that supports the bicycle frame is intended to support the diagonal tube of the frame or the seat tube, or, in any event, a part of the frame other than the upper horizontal tube, such that the size of the arm [6] that carries the said supporting element can be reduced accordingly. The cradle-shaped strike of the supporting element that supports the frame can be adjusted in terms of both its position along the arm [6] and its angular position about the axis [82] (see FIG. 4) so that it can be adapted optimally to the configuration of the bicycle to be held. Analogously, the supporting elements [4] [5] upon which the bicycle wheels rest are positioned at the optimal distance for the best support of the bicycle wheels. Once these operations have been performed, the bicycle-carrier device is automatically calibrated for a given bicycle, such that none of the adjustment operations needs to be repeated the next time the same device is used with the same bicycle.

The structure of the bicycle-carrier device is extremely simple, consisting of a limited number of components (essentially the bar [3] and the articulated arm [6]). The latch device that can be operated with the handle [64] is easy and rapid to use, and ensures the locking of the articulated arm [6] in both its operating position and its lowered position. In the latter position, the configuration of the entire device becomes extremely compact, for convenient and easy storage.

In addition to being simple and easy to use, the device according to the invention is also characterized by a high degree of versatility, inasmuch as it is easily adaptable to different bicycle configurations and also allows different relative positions of the bicycles, as shown for example in FIGS. 7 through 9.

Naturally, without limiting the principle of the invention, the details of its construction and the embodiments may be varied broadly from the ones described and illustrated here purely as examples, without thereby departing from the scope of the present invention.

The invention claimed is:

1. A bicycle-carrying device for motor-vehicles, comprising:
   a connection arm configured to connect to a hitch of a motor-vehicle;
   a bar supported by and arranged transversely with respect to the connection arm, the bar extending continuously between first and second ends and defining an intermediate portion arranged between the first and second ends, wherein the intermediate portion of the bar has an inwardly facing surface facing toward the motor-vehicle and an outwardly facing surface facing away from the motor-vehicle, and wherein the bar is configured such that the first and second ends and the intermediate portion are non-pivotable relative to each other;
   a mounting arrangement for securing the intermediate portion of the bar to the connection arm, wherein the mounting arrangement includes a pair of plates sandwiching the intermediate portion of the bar therebetween with the pair of plates of the mounting arrangement including;
     an inner plate having an inner plate lower portion and an inner plate upper portion, wherein the inner plate lower portion faces and engages the inwardly facing surface of the intermediate portion of the bar and wherein the inner plate upper portion extends upwardly above the intermediate portion of the bar; and
     an outer plate having an outer plate lower portion and an outer plate upper portion, wherein the outer plate lower portion faces and engages the outwardly facing surface of the intermediate portion of the bar and wherein the outer plate upper portion extends upwardly above the intermediate portion of the bar; and
     fasteners that extend between the inner and outer plates, wherein the fasteners clamp the inner plate lower portion against the inwardly facing surface of the intermediate portion of the bar and the outer plate lower portion against the outwardly facing surface of the intermediate portion of the bar; and
   a support arm for supporting a frame of a bicycle, wherein the support arm is pivotally connected to the mounting arrangement with a pivot pin that extends through the support arm and the upper portions of the inner and outer plates of the mounting arrangement at a location above the intermediate portion of the bar, and wherein the support arm is pivotably movable between a raised operating position in which the support arm extends generally upwardly away from the bar and a lowered non-operating position in which the support arm extends generally parallel to and overlies the bar.

2. The bicycle-carrying device of claim 1, wherein the support arm includes a pair of branches that are parallel to and spaced from each other.

3. The bicycle-carrying device of claim 2, wherein each branch of the pair of branches of the support arm has an inner end arranged transversely outward relative to the intermediate portion of the bar.

4. The device of claim 3, wherein the inner ends of the pair of branches of the support arm are arranged outwardly of the pair of plates.

5. The bicycle-carrying device of claim 4, wherein each of the inner and outer plates of the mounting arrangement includes an ear defined at least partially at the respective upper portion extending from a body portion defined at least partially at the respective lower portion and wherein the pivot pin extends through the inner ends of the branches of the support arm and the ears of the inner and outer plates of the mounting arrangement, the pivot pin defining a pivot axis about which the support arm can pivot from the raised operating position to the lowered non-operating position.

6. The bicycle-carrying device of claim 2, wherein an inward branch of the pair of branches of the support arm is arranged relatively closer to the connection arm and an outward branch of the pair branches of the support arm is arranged relatively further from the connection arm, and wherein a longer one of the inward and outward branches of the support arm extends relatively further than a shorter one of the inward and outward branches of the support arm relative to the mounting arrangement.

7. The bicycle-carrying device of claim 6, wherein the outward branch defines the longer one of the inward and outward branches of the support arm.

8. The bicycle-carrying device of claim 7, wherein the inward branch extends at least partially across the mounting arrangement without extending over the bar.

9. The bicycle-carrying device of claim 1, wherein the support arm includes an inward branch and an outward branch respectively arranged relatively closer to and further from the connection arm, and wherein the mounting arrangement is located between the inward and outward branches of the support arm.

10. The bicycle-carrying device of claim 9, wherein the pivot pin extends through ends of the inward and outward branches of the support arm defining a pivot axis of the support arm relative to the bar and wherein the pivot axis of the pivot pin is arranged above the bar.

11. The bicycle-carrying device of claim 10, wherein each of the inner and outer plates of the mounting arrangement includes an ear and wherein the pivot pin extends through the ears of the inner and outer plates.

12. A bicycle-carrying device for motor-vehicles, comprising:
 a connection arm configured to connect to a hitch of a motor-vehicle;
 a bar supported by and arranged transversely with respect to the connection arm, the bar extending continuously between first and second ends and defining an intermediate portion arranged between the first and second ends, wherein the intermediate portion of the bar has an inwardly facing surface facing toward the motor-vehicle and an outwardly facing surface facing away from the motor-vehicle;
 a mounting arrangement secured to the intermediate portion of the bar, wherein the mounting arrangement is configured to fix the connection arm and the bar with respect to each other, wherein the mounting arrangement includes a pair of plates sandwiching the intermediate portion of the bar therebetween with the pair of plates of the mounting arrangement including;
  an inner plate having an inner plate lower portion and an inner plate upper portion with the inner plate lower portion engaging the inwardly facing surface of the intermediate portion of the bar and the inner plate upper portion extending upwardly above the intermediate portion of the bar; and
  an outer plate having an outer plate lower portion and an outer plate upper portion with the outer plate lower portion engaging the outwardly facing surface of the intermediate portion of the bar and the outer plate upper portion extending upwardly above the intermediate portion of the bar; and
 an arm for supporting a frame of a bicycle, wherein the arm is pivotally connected to the mounting arrangement with a pivot pin that extends through the arm and the upper portions of the inner and outer plates of the mounting arrangement and wherein the arm is pivotably movable between a raised operating position in which the arm extends generally upwardly away from the bar and a lowered non-operating position in which the arm extends generally parallel to and overlies the bar, wherein the arm includes a pair of branches that are parallel to and spaced from each other, wherein an inward branch of the pair of branches of the arm is arranged relatively closer to the connection arm and an outward branch of the pair of branches of the arm is arranged relatively further from the connection arm, and wherein a longer one of the inward and outward branches of the arm extends relatively further than a shorter one of the inward and outward branches of the arm relative to the mounting arrangement, wherein the outward branch defines the longer one of the inward and outward branches of the arm, and wherein the outward branch extends at least partially across each of the mounting arrangement and the bar.

13. A bicycle-carrying device for motor-vehicles, comprising:
 a connection arm configured to connect to a hitch of a motor-vehicle;
 a bar supported by and arranged transversely with respect to the connection arm, the bar extending continuously between first and second ends and defining an intermediate portion arranged between the first and second ends, wherein the intermediate portion of the bar is secured to the connection arm and the first end of the bar is located outwardly relative to the intermediate portion and the connection arm in a first direction and the second end of the bar is located outwardly relative to the intermediate portion and the connection arm in a second direction opposite tie first direction, wherein the intermediate portion of the bar has an inwardly facing surface facing toward the motor-vehicle and an outwardly facing surface facing away from the motor-vehicle, and wherein the bar is configured such that the first and second ends and the intermediate portion are non-pivotable relative to each other;
 a support arm for supporting a frame of a bicycle; and
 a pivot connection interposed between the bar and the support arm, wherein the pivot connection comprises a pair of plates located one against the inwardly facing surface of the intermediate portion of the bar and another against the outwardly facing surface of the intermediate portion of the bar, wherein each plate includes a mounting ear, and wherein the mounting ears of the plates extend upwardly relative to the bar above an upper surface defined by the bar, wherein the support arm is pivotably secured to the mounting ears via a pivot pin that extends through the mounting ears and through a lower end defined by the support arm at a location above the bar, wherein the pivot pin defines a pivot axis about which the support arm is pivotable between a raised operating position in which the support arm extends generally upwardly away from the bar and a lowered non-operating position in which the support arm overlies the bar.

14. The bicycle-carrying device of claim 13, wherein the pair of plates are further configured to secure the connection arm to the bar, wherein an inner one of the plates is secured to the connection arm and an outer one of the plates is clamped against the outwardly facing surface of the bar via fasteners that extend between the inner and outer plates.

15. The bicycle-carrying device of claim 13, wherein the support arm includes a pair of branches that are parallel to and spaced from each other, wherein each branch of the pair of branches extends transversely outward relative to the intermediate portion of the bar, and wherein an inner end of each branch is pivotably mounted via the pivot pin to one of the mounting ears.

16. The bicycle-carrying device of claim 13, further comprising a releasable retainer arrangement interposed between the support arm and one of the plates for selectively retaining the support arm in the raised operating position.

17. The bicycle-carrying device of claim 16, wherein the releasable retainer arrangement comprises a biased retainer pin that is selectively movable between an engaged position in which the retainer pin extends through aligned openings in the plate and the support arm to prevent pivoting movement of the support arm relative to the plate, and a release position in which the retainer pin is movable out of one of the aligned openings to enable pivoting movement of the support arm relative to the plate.

* * * * *